United States Patent [19]

Miyamoto

[11] 3,730,532

[45] May 1, 1973

[54] COMBINATION FOUR-CHANNEL TWO-CHANNEL STEREOPHONIC ENDLESS CARTRIDGE TAPE PLAYER

[75] Inventor: Mitsugu Miyamoto, Arigesaki, Matsumato, Japan

[73] Assignee: Victor Company of Japan, Limited, Yokohama, Japan

[22] Filed: June 7, 1971

[21] Appl. No.: 150,539

[30] Foreign Application Priority Data

June 9, 1970 Japan ................................45/50102

[52] U.S. Cl....274/4 G, 179/100.2 CA, 179/100.2 Z, 274/4 A, 274/4 G

[51] Int. Cl....G11b 21/12, G11b 15/12, G11b 21/08

[58] Field of Search..............179/100.2 CA, 100.2 Z; 274/4 A, 4 B, 4 G

[56] References Cited

UNITED STATES PATENTS

| | | | |
|---|---|---|---|
| 3,507,501 | 4/1970 | Lear | 179/100.2 Z |
| 3,531,126 | 9/1970 | Tsukagoshi et al. | 274/4 A |
| 3,592,476 | 7/1971 | MacDonald | 274/4 A |

*Primary Examiner*—J. Russell Goudeau
*Attorney*—Stevens, Davis, Miller & Mosher

[57] ABSTRACT

A tape player adapted to play both a conventional two-channel stereophonic cartridge tape and a four-channel stereophonic cartridge tape developed recently. The tape player is capable of sensing whether the tape inserted in the player is a two-channel tape or four-channel tape and is capable of switching reproducing circuits between two-channel and four-channel stereophonic systems in accordance with the type of cartridge tape inserted in the player. The tape player is also capable of indicating whether the stereophonic recording being played back is of the two-channel system or four-channel system and at the same time indicating the program of the recording.

4 Claims, 12 Drawing Figures

COMBINATION FOUR-CHANNEL TWO-CHANNEL STEREOPHONIC ENDLESS CARTRIDGE TAPE PLAYER

This invention relates to tape players which are adapted for playing endless cartridge tapes, and more particularly it is concerned with a combination two-channel four-channel tape player of the type which can play both a four-channel stereophonic cartridge tape and two-channel stereophonic cartridge tape and which is constructed such that sound reproduction can be carried out in two stereophonic systems with one system not interfering with the other system.

Eight-track two-channel endless cartridge tapes which are popular and widely used today comprise eight tracks formed thereon and disposed across the width thereof. Two-channel stereophonic recordings are made by assigning tracks 1 to 4 to the left channel and tracks 5 to 8 to the right channel. When the recordings made in this way are reproduced, a plurality of magnetic heads for the left and right channels respectively are moved such that they successively scan tracks 1 and 5, tracks 2 and 6, tracks 3 and 7 and tracks 4 and 8 respectively.

Besides the aforementioned eight-track two-channel endless cartridge tapes, eight-track four-channel endless cartridge tapes have recently been developed. In these cartridge tapes, four-channel stereophonic recordings are made by using eight tracks such that tracks 1 and 2 are assigned to the left front channel, tracks 3 and 4 to the left rear channel, tracks 5 and 6 to the right front channel and tracks 7 and 8 to the right rear channel. When the recordings made in this way are reproduced, magnetic heads for the left front, left rear, right front and right rear channels respectively are moved such that they scan the tracks 1, 3, 5, 7 and 2, 4, 6, 8 respectively.

Accordingly, a first object of this invention is to provide a utility tape player which can play both a four-channel stereophonic cartridge tape and a two-channel stereophonic cartridge tape.

A second object of this invention is to provide a utility tape player which is constructed basically for playing a two-channel stereophonic cartridge tape and which is yet capable of playing a four-channel stereophonic cartridge tape.

A third object of this invention is to provide a utility tape player which is constructed such that reproducing circuits are switched to the four-channel stereophonic system when a four-channel stereophonic cartridge tape is played and to the two-channel stereophonic system when a two-channel stereophonic cartridge tape is played.

A fourth object of this invention is to provide a utility tape player which is provided with means for automatically sensing whether the cartridge tape inserted in the player is a four-channel stereophonic cartridge tape or two-channel stereophonic cartridge tape.

A fifth object of this invention is to provide a utility tape player which is provided with means for indicating whether the stereophonic cartridge tape being played is of the four-channel type or two-channel type.

A sixth object of this invention is to provide a utility tape player which is provided with means for indicating the program of a stereophonic cartridge tape being played.

Additional objects as well as features and advantages of this invention will become evident from the description st forth hereinafter when considered in conjunction with the accompanying drawings, in which.

This invention will now be explained in detail with reference to the accompanying drawings in which like reference characters designate similar parts in all the drawings.

Figure 1:
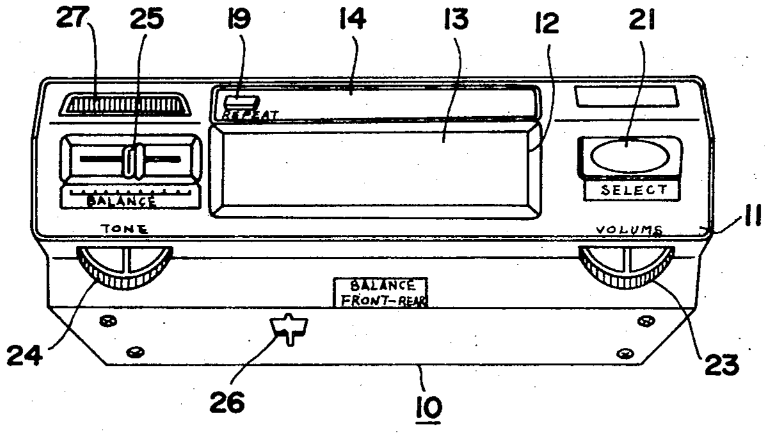
FIG. 1 is a perspective view of one embodiment of the utility tape player adapted for playing both four-channel and two-channel stereophonic cartridge tapes according to this invention.
Figure 2:
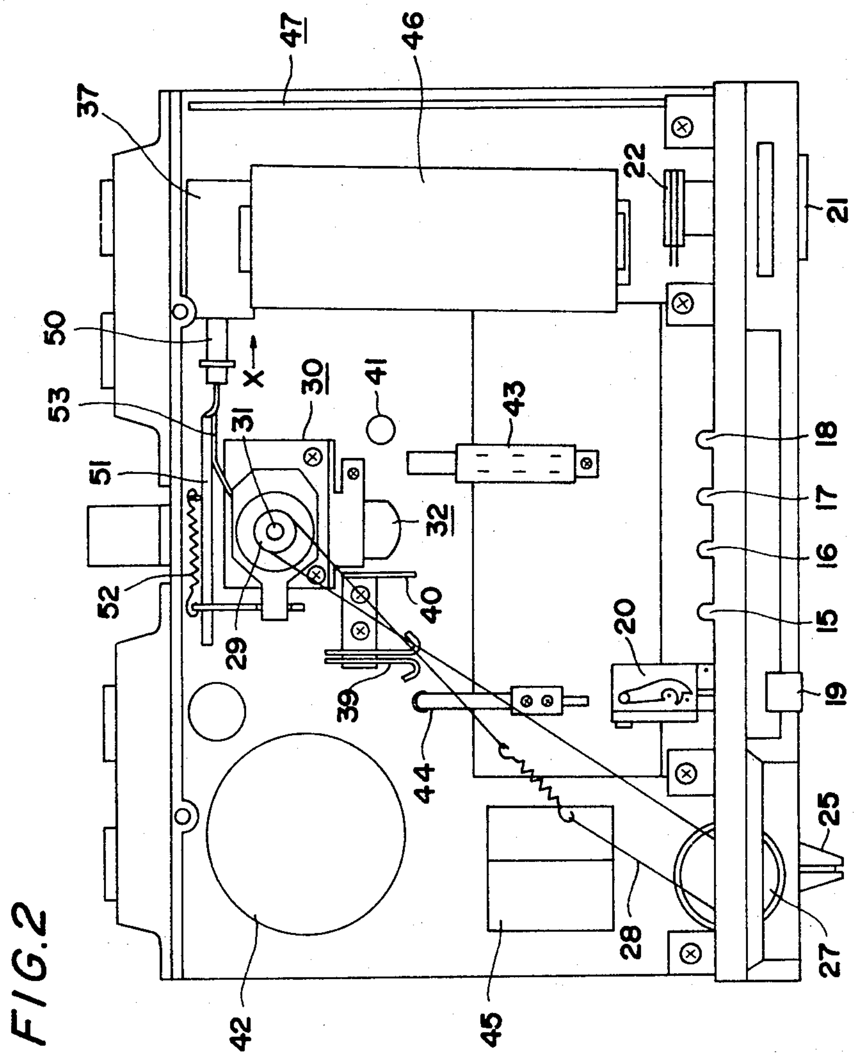
FIG. 2 is a plan view of the player of FIG. 1 with the upper cover thereof being removed.

An embodiment of this invention shown in FIGS. 1 and 2 comprises a casing 11 which is formed with a cartridge tape receiving opening 12 substantially in the central portion of the front surface thereof. A cover 13 is provided for freely opening and closing the opening 12 which is normally closed. The casing 11 is also formed with a window 14 disposed above the cartridge receiving opening 12 for indicating whether the stereophonic cartridge tape being played is of the 4-channel type or 2-channel type and at the same time indicating the program of the cartridge tape being played.

Four indication lamps 15, 16, 17 and 18 are disposed rearwardly of the window 14. A repeat switch button 19 is provided in the window 14 for operating a repeat switch 20 when it is desired to repeatedly play the same program. Disposed at the right side on the front surface of the casing 11 is a select switch button 21 for operating a select switch 22 when it is desired to select a program.

A volume controlling knob 23 and a tone controlling knob 24 are disposed at the right and left sides of the front surface of the casing 11 respectively. A left and right sound volume balance control knob 25 for controlling the balance of left and right sound volumes is also provided at the left side of the front surface of the casing 11. A front and rear sound volume balance control knob 26 is disposed on the underside of the bottom plate of the casing 11 for controlling the balance of front and rear sound volumes.

A knob 27 is disposed at the left side of the front surface of the casing 11 for adjusting the height of the magnetic heads. By turning the knob 27, a nutlike fine adjustment knob 29 threadably connected to a shaft 31 at its topmost portion 31*a* for vertically moving a magnetic head moving mechanism 30 is turned, through a resilient wire 28, in a direction opposite to the direction in which the knob 29 is threadably mounted, so that fine adjustments of the height of the magnetic heads can be effected by turning the fine adjustment knob.

A four-channel magnetic head assembly 32 (See FIG. 3) comprising four magnetic heads 33, 34, 35 and 36 arranged vertically and spaced equidistantly from one another is capable of changing its vertical position in four stages in response to the energization of a solenoid 37 and the operation of a stepped ratchet cam 38 as subsequently to be described. 39 is a sensor adapted to be closed by a metal foil member or the like which is adhered to the recording terminating portion of a magnetic tape. When the sensor is closed, the solenoid 37 is energized for successively moving the magnetic heads to the next tracks.

40 is a tape guide, 41 a capstan, 42 a motor for driving the capstan 41, 43 a power source switch which is adapted to be turned on and off when a cartridge tape is inserted and removed, and 44 a sensing slot switch which is adapted to automatically distinguish a four-channel stereophonic cartridge tape from a two-channel stereophonic cartridge tape. Upon actuation of the switch 44, reproducing circuits of the player are changed over either to the four-channel stereophonic system or to the two-channel stereophonic system by means of a relay switch 45. 46 is a preamplifier assembly, and 47 a main amplifier assembly.

Figure 3:
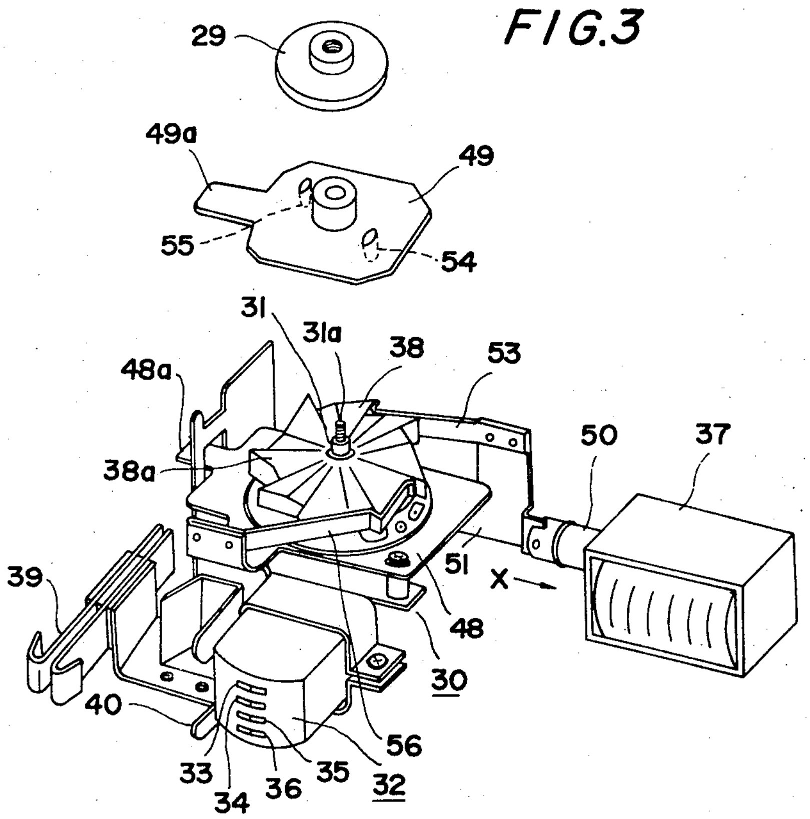
FIG. 3 is a perspective view, on an enlarged scale, of the magnetic head moving mechanism of the player of FIG. 1.

FIG. 3 is a perspective view of the magnetic head moving mechanism 30 of the player. The mechanism is mounted on the shaft 31 connected vertically to a base plate and urged to move upwardly by a compression spring (not shown) mounted in the lower portion of the shaft. The mechanism comprises a first plate 48 disposed at a lower level to be connected to the four-channel magnetic head assembly 32 as a unit and formed with an opening for the shaft 31 to extend therethrough, a second plate 49 disposed at an upper level and formed with an opening for the shaft 31 to extend therethrough, and the stepped ratchet cam 38 disposed between the two plates 48 and 49 and formed with an opening for the shaft 31 to extend therethrough. The fine adjustment knob 29 is threadably mounted on the uppermost outer threaded portion 31*a* of the shaft 31. The two plates 48 and 49 and the ratchet cam 38 are held in place by the fine adjustment knob 29. Projections 48*a* and 49*a* of the two plates 48 and 49 respectively are supported for free vertical movement.

The operation of the stepped ratchet cam 38 will be explained. Upon energization of the solenoid 37, an iron core 50 and an arm 51 are pulled to move in the direction of the arrow X in FIG. 2. If the solenoid 37 is de-energized, then the iron core 50 and arm 51 are urged to move by the biasing force of a spring 52 in a direction opposite to the direction of the arrow X. At this time, a feed pawl 53 connected to the arm 51 angularly rotates the ratchet cam 38 by one stage.

The ratchet cam 38 is formed on its upper surface 38*a* with spirally arranged steps of heights which correspond to the amounts of movement of the magnetic heads 33, 34, 35 and 36 of the magnetic head assembly 32 as they are moved successively to come into contact with the respective tracks on the magnetic tape. The second plate 49 is formed on its underside with downwardly extending projections 54 and 55 which are adapted to be maintained in engagement with the steps on the upper surface 38*a* of the ratchet cam 38 at all times. As the ratchet cam 38 rotates, the magnetic head assembly 32 is moved up and down by the projections 54 and 55 so that the assembly may be made to correspond to the channels of the tracks on the magnetic tape. 56 is a detent.

The electric circuit diagram of one embodiment of this invention will now be explained with reference to FIG. 4. For convenience's sake, the magnetic heads 33 and 34 of the magnetic head assembly 32 are assumed to correspond to the left front and rear channels and the magnetic heads 35 and 36 thereof are assumed to correspond to the right front and rear channels. 57, 58, 59 and 60 are preamplifiers of the respective channels connected to the respective magnetic heads and are built in the preamplifier assembly 46. 61, 62, 63 and 64 are main amplifiers of the respective channels connected to the respective preamplifiers 57, 58, 59 and 60 and are built in the main amplifier assembly 47. 65, 66, 67 and 68 are speakers of the respective channels connected to the main amplifiers 61, 62, 63 and 64 respectively of these channels.

Figure 5:
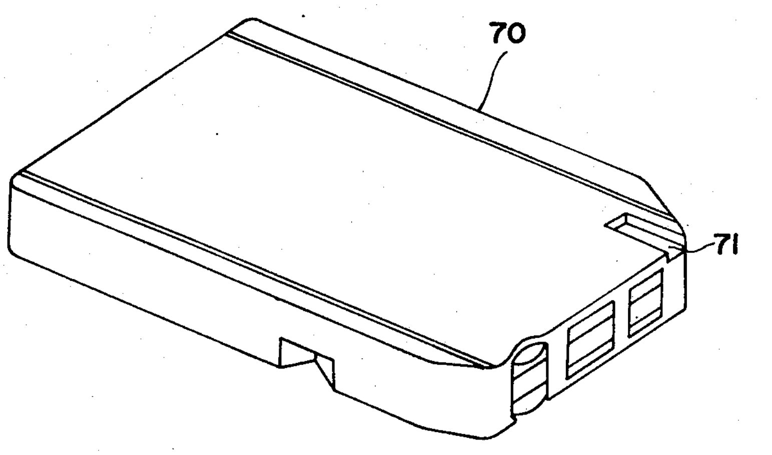
FIG. 5 is a perspective view showing an eight-track four-channel stereophonic endless cartridge tape by way of illustration.
Figure 8A:
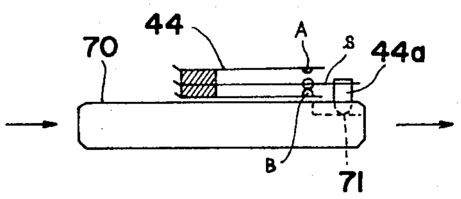
FIGS. 8A and 8B are views in explanation of the relation between the cartridge tape and channel change-over switch, the cartridge tapes shown in FIGS. 8A and 8B being of the four-channel type and two-channel type respectively.

69 is a power source section for the tape player as a whole. The aforementioned power source switch 43 is connected to the power source section 69 and is adapted to be closed when either a two-channel stereophonic cartridge tape or four-channel stereophonic cartridge tape is inserted in the cartridge tape receiving opening 12 of the player. The sensing slot switch 44 is intended for changing over from the two-channel stereophonic system to the four-channel stereophonic system. When a cartridge tape 70 of the four-channel stereophonic type is inserted in the cartridge receiving opening 12 of the player, a slot 71 formed, for example, in the front upper side portion of the cartridge as shown in FIG. 5 is effective to prevent the upward movement of a projection 44*a* formed at a forward end of a movable contact S of the switch 44, so that the projection 44*a* is not displaced and remains in its original position as shown in FIG. 8A. Accordingly, the movable contact S remains in engagement with the contact B and a relay coil 72 of the relay switch 45 is energized to turn on switches 73, 74, 75, 76, 77 and 78 and bring movable contacts S thereof into engagement with the contacts B.

Figure 8B:
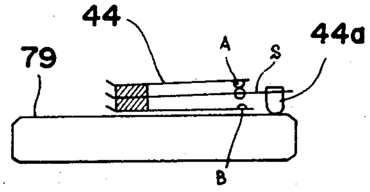

When a conventional two-channel stereophonic cartridge tape 79 is inserted in the cartridge receiving opening 12 of the player, the projection 44*a* provided at the forward end of the movable contact S of the sensing slot switch 44 is moved upwardly by the front upper side portion of the cartridge as shown in FIG. 8B because there is no slot 71 shown in FIG. 5 in the front upper side portion of such cartridge. The movable contact S is thus brought into engagement with the contact A, and the relay coil 72 is de-energized to turn off the switches 73, 74, 75, 76, 77 and 78 and move movable contacts S thereof toward the contact A side.

80 is a conventional rotary switch for rotating a rotary contact 81 in conjunction with the movement of the magnetic head assembly 32 subsequently to be described. The rotary switch 80 forms a circuit which functions to successively turn on and off the indication lamps and which, when the four-channel stereophonic cartridge tape 70 is inserted in the cartridge receiving opening 12, cooperates with a blocking oscillator subsequently to be described (multivibrator, for example) to restore the magnetic head assembly 32 to a position commensurate with the first program when playing of the second program is finished.

82 is a manually operated pushbutton switch connected in parallel with opposite ends of the sensor 39. If this pushbutton switch is depressed, then the magnetic head assembly 32 moves to the next track even during playing. 83 is a multivibrator which is adapted to cause a current to intermittently flow to its output side after a given time has elapsed when connected to the power source 69. A relay 84 is connected to the output side. If a current is passed to the relay 84, then a switch 85 is turned on and a movable contact S thereof is moved to the contact *a* side. This energizes the solenoid 37 so as to successively move the magnetic head assembly 32.

The aforementioned operation is effective, when the four-channel stereophonic cartridge tape 70 is used, to rapidly move the magnetic head assembly 32 to restore the same to a position commensurate with the first program when playing of the second program is completed. If the conventional two-channel stereophonic cartridge tape 79 were used, the magnetic head assembly 32 would not be restored to a position commensurate with the first program in such a case, unless playing of the third and fourth programs is completed. This operation is subsequently to be described further in detail.

Figure 4:
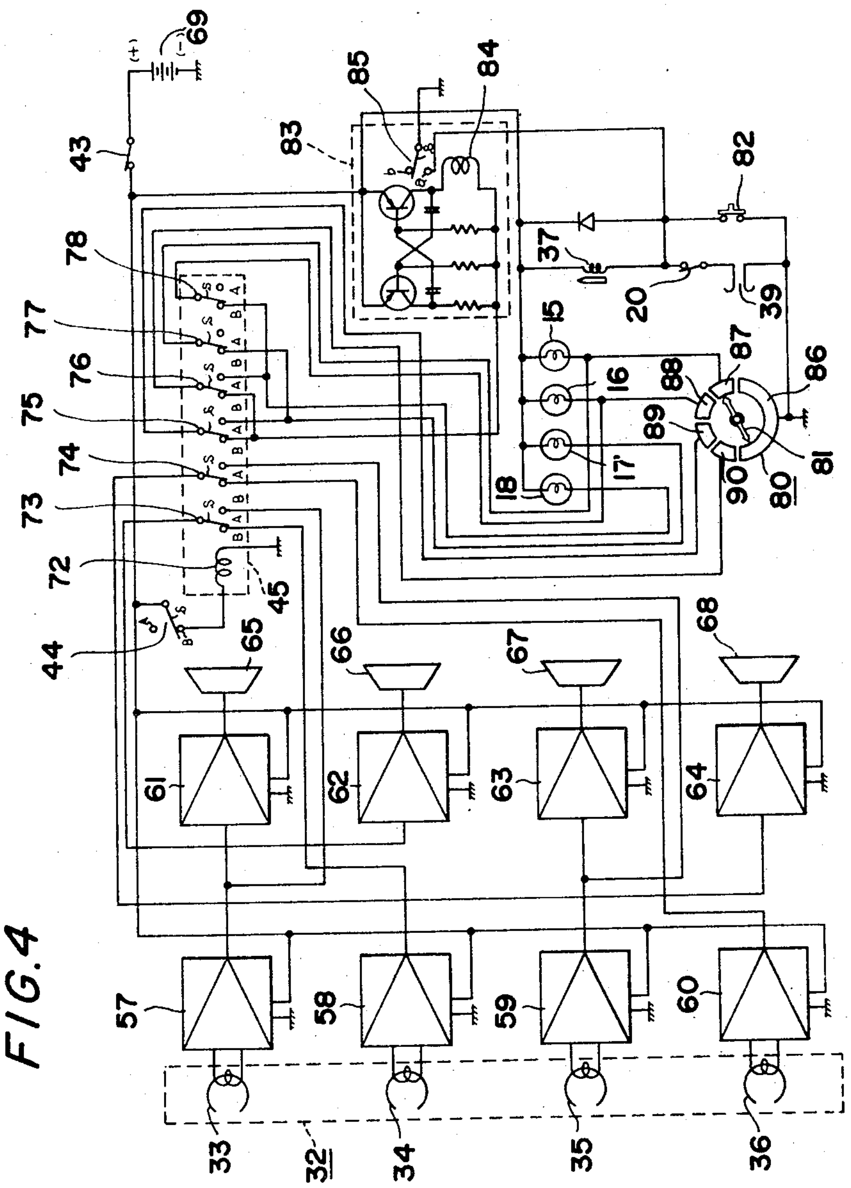
FIG. 4 is an electric circuit diagram of the player of FIG. 1.

The circuit shown in FIG. 4 is in a state in which the 4-channel stereophonic cartridge tape 70 is inserted in the cartridge receiving opening 12 of the player and the first program is being played. As aforementioned, the movable contact S of the sensing slot switch 44 for switching the player from the two-channel stereophonic system to the four-channel stereophonic system is shown as being in engagement with the contact B, and the relay coil 72 of relay switch 45 is energized to turn on the switches 73, 74, 75, 76, 77 and 78 and move the movable contacts S thereof toward the contact B side. Because of this, a left front channel signal picked up by the magnetic head 33 corresponding to the left front channel with respect to the listener is passed through the preamplifier 57 and main amplifier 61 and reproduced through the speaker 65 disposed on the left front side (See FIG. 10) with respect to the listener.

A left rear channel signal picked up by the magnetic head 34 corresponding to the left rear channel with respect to the listener is passed through the preamplifier 58, switch 73 of the relay switch 45 and main amplifier 62 and reproduced through the speaker 66 disposed on the left rear side with respect to the listener.

A right front channel signal picked up by the magnetic head 35 corresponding to the right front channel with respect to the listener is passed through the preamplifier 59 and main amplifier 63 and reproduced through the speaker 67 disposed on the right front side with respect to the listener.

A right rear channel signal picked up by the magnetic head 36 corresponding to the right rear channel with respect to the listener is passed through the preamplifier 60, switch 74 of the relay switch 45 and main amplifier 64 and reproduced through the speaker 68 disposed on the right rear side with respect to the listener. It is thus possible for the tape player according to this invention to achieve better results than conventional players of the two-channel stereophonic system in giving to the listener an impression of direction and so enhance the realism of the reproduction.

Figure 9A:
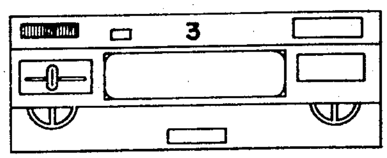
FIGS. 9A and 9B are views showing the manner in which the program of a cartridge tape being played is indicated, the cartridge tapes shown in FIGS. 9A and 9B being of the two-channel type and four-channel type respectively.
Figure 9B:
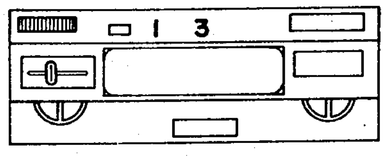

During the time the first program is being played, the rotary contact 81 of rotary switch 80 is connected across a common contact 86 connected to the negative electrode (−) of the power source and a contact 87, so that the indication lamp 15 for indicating the program is turned on and the indication lamp 17 is also turned on through the switch 77 of relay switch 45, thereby indicating that the first and third programs are being played (See FIG. 9B).

Upon completion of playing of the first program, the metal foil member adhered to the recording terminating portion of the magnetic tape closes the opposite ends of sensor 39 and energizes the solenoid 37 for moving the magnetic head assembly 32 into contact with the next tracks. In conjunction with the movement of the magnetic head assembly, the rotary contact 81 of rotary switch 80 is rotated into engagement with the common contact 86 and a contact 88, thereby initiating playing of the second program. During the time the second program is being played, the indication lamps 15 and 17 are turned off and the indication lamp 16 is turned on and the indication lamp 18 is also turned on through the switch 78 of relay switch 45.

Upon completion of playing of the second program, the metal foil member adhered to the recording terminating portion of the magnetic tape closes the sensor 39 as aforementioned and energizes the solenoid 37 to move the magnetic heads into contact with the next tracks. At the same time, the rotary contact 81 of rotary switch 80 is rotated into engagement with the common contact 86 and a contact 89.

Figure 7:
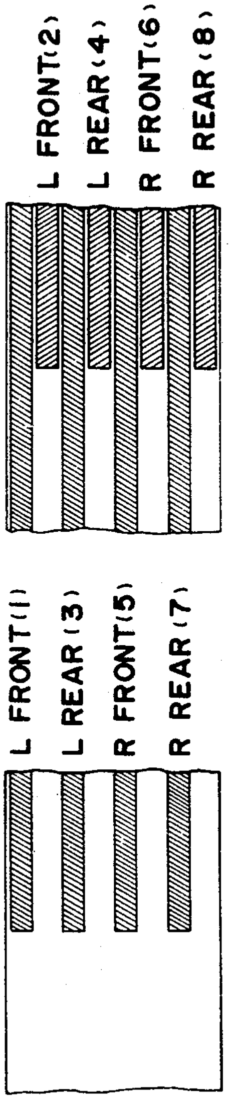
FIG. 7 shows the manner in which a four-channel stereophonic recording is made in an eight-track tape.

The movement of the magnetic head assembly in this way will result in the magnetic heads 33, 34, 35 and 36 being moved such that the magnetic head 33 corresponds to the left rear channel (L Rear 3) of the first program of magnetic tape, the magnetic head 34 corresponds to the right front channel (R Front 5) of the first program and the magnetic head 35 corresponds to the right rear channel (R Rear 7) of the first program as shown in FIG. 7, while the magnetic head 36 remains out of contact with any of the tracks of channels. If sound reproduction is carried out with the magnetic heads in this condition, there will be no unity in stereophonic sound reproduction.

In order to obviate this problem, the following operation is performed when sound reproduction is carried out in the four-channel stereophonic system. That is, when the magnetic heads are moved into contact with the next tracks and the rotary contact 81 of rotary switch 80 is rotated into engagement with the common contact 86 and the contact 89 upon completion of playing of the second program as aforementioned, the negative electrode (−) of the power source 69 is connected to the multivibrator 83 through the switch 75 of relay switch 45. This results in a current being passed, for a given interval of time (the time during which the solenoid 37 remains energized), to the relay 84 connected to the output side of the multivibrator, so that the movable contact S connected to the negative electrode (−) of power source 69 of switch 85 operated by the relay is brought into engagement with the contact *a* connected to the other end of the solenoid 37 connected at one end thereof to the positive electrode (+) of power source 69. This energizes the solenoid 37 and moves the magnetic heads into contact with the next tracks and at the same time causes the rotary contact 81 of rotary switch 80 to rotate into engagement with the common contact 86 and a contact 90, thereby connecting the negative electrode (−) of power source 69 to the multivibrator 83 through the switch 76 of relay switch 45. When this occurs, a current is passed for a given interval of time to the relay 84 connected to the output side of the multivibrator 83 and the movable contact S of the switch 85 is brought into engagement with the contact *a*, so that the solenoid 37 is energized and the magnetic head assembly is restored to the original position in which the magnetic head 33 corresponding to the left front channel is returned to a position in which it corresponds to the left front channel (L Front 1) of the first program before playing of the first program is initiated. At the same time, the rotary contact 81 of rotary switch 80 rotates into engagement with the common contact 86 and the contact 87, thereby disconnecting the multivibrator 83 from the power source. According to this invention, sound reproduction in the four-channel stereophonic system is carried out in the manner described above.

The operation of the player when the cartridge tape 79 of the two-channel stereophonic system is inserted in the cartridge receiving opening 12 of the player will now be explained.

The cartridge in this case is not formed with the slit 71 shown in FIG. 5. Thus, the absence of the slit 71 causes the contact S of sensing slot switch 44 for switching between the two-channel and four-channel stereophonic systems to move into engagement with the contact A, so that the relay switch 45 is turned off and the contacts S of switches 73, 74, 75, 76, 77 and 78 are brought into contact with the contacts A.

Figure 6:
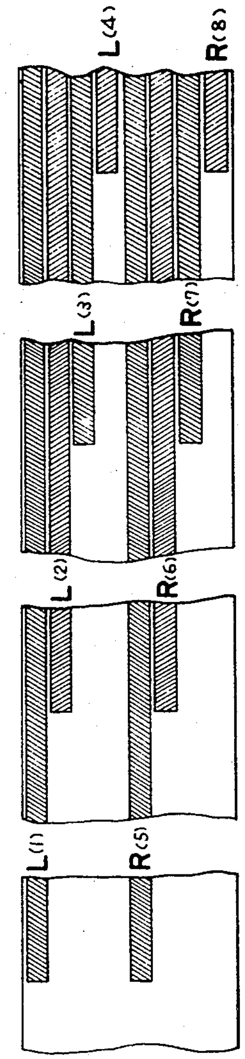
FIG. 6 shows the manner in which a two-channel stereophonic recording is made in an eight-track tape.

Accordingly, application of the signal picked up by the magnetic head 34 and the signal picked up by the magnetic head 36 to the respective main amplifiers is prevented by the aforementioned movements of the contacts S of the switches 73 and 74 of relay switch 45 respectively. That is, the magnetic heads 34 and 36 are brought to a state in which they are virtually rendered inoperative. When explained with reference to FIG. 6, the magnetic head 33 corresponds to the left channel (L 1) of the first program of eight-track two-channel stereophonic tape and the magnetic head 35 to the right channel (R 5) of the first program of eight-track two-channel stereophonic tape which is similar to the arrangement of magnetic tapes in the conventional eight-track two-channel stereophonic system.

The signal picked up by the magnetic head 33 and amplified by the preamplifier 57 is passed through the main amplifier 61 and reproduced by the speaker 65. At the same time, it is passed through the switch 73 of relay switch 45 and the main amplifier 62 and reproduced by the speaker 66.

Figure 10:
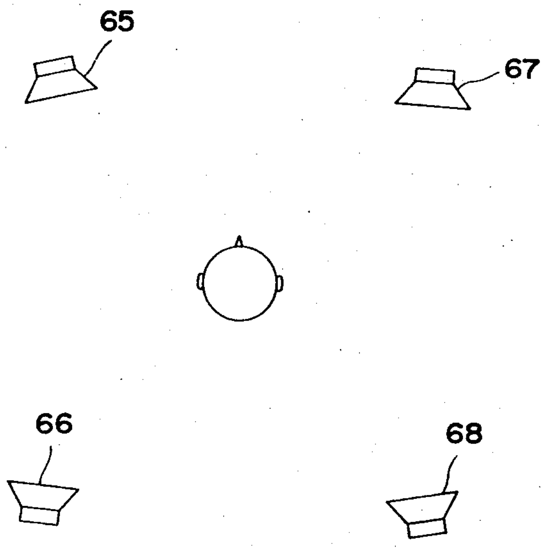
FIG. 10 shows by way of illustration the manner in which the speakers of the tape player are arranged.

The signal picked up by the magnetic head 35 and amplified by the preamplifier 59 is passed through the main amplifier 63 and reproduced by the speaker 67. At the same time, it is passed through the switch 74 of relay switch 45 and the main amplifier 64 and reproduced by the speaker 68. Even if these speakers are arranged as shown in FIG. 10, stereophonic sound reproduction from the left and right sides can be carried out without any trouble.

During the time the first program is being played, the rotary contact 81 of rotary switch 80 is maintained in engagement with the common contact 86 and contact 87, so that the indication lamp 15 is turned on to indicate that the first program is being played.

Upon completion of playing of the first program, the metal foil member adhered to the recording terminating portion of the magnetic tape closes the opposite ends of sensor 39 so as to energize the solenoid 37 for moving the magnetic heads into contact with the next tracks. As a result, the magnetic head 33 is moved to a position in which it corresponds to track L (2) of the left channel of second program of the magnetic tape and the magnetic head 35 to a position in which it corresponds to track R (6) of the right channel of second program (See FIG. 6), and playing of the second program is initiated.

At the same time, the rotary contact 81 of rotary switch 80 is rotated into engagement with the common contact 86 and contact 88 and the indication lamp 16 is turned on to indicate that the second program is being played.

Upon completion of playing of the second program, the metal foil member adhered to the recording terminating portion of the magnetic tape closes the opposite ends of sensor 39 and the solenoid 37 is energized as aforementioned, so that the magnetic heads 33 and 35 are moved to positions in which the former corresponds to the left channel (L 3) of the third program and the latter to the right channel (R 7) of the third program. Thus, playing of the third program is initiated.

At the same time, the rotary contact 81 of rotary switch 80 is rotated into engagement with the common contact 86 and contact 89 and the negative electrode (−) of power source 69 is connected to the indication lamp 17 through the switch 75 of relay switch 45, so that the lamp 17 is turned on to indicate that the third program is being played (See FIG. 9A).

Upon completion of playing of the third program, the metal foil member adhered to the recording terminating portion of the magnetic tape closes the opposite ends of sensor 39 and the solenoid 37 is energized, so that the magnetic heads 33 and 35 are moved to positions in which the former corresponds to the left channel (L 4) of the fourth program and the latter to the right channel (R 3) of the fourth program. Thus, playing of the fourth program is initiated.

At the same time, the rotary contact 81 of rotary switch 80 is rotated into engagement with the common contact 86 and contact 90 and the negative electrode (−) of power source 69 is connected to the indication lamp 18 through the switch 76 of relay switch 45, so that the lamp 18 is turned on to indicate that the fourth program is being played.

A cartridge tape of the eight-track two-channel stereophonic system is played in the manner described above. In this case, the movable contacts S of all the switches of relay switch 45 are in engagement with the contacts A. This avoids the connection of the negative electrode (−) of power source 69 to the multivibrator 83 as is the case with the playing of a cartridge tape of the four-channel stereophonic system, even if the rotary contact 81 of rotary switch 80 rotates into engagement with the common contact 86 and contact 89 or contact 90. This is conducive to prevention of energization of the solenoid 37 by the operation of the multivibrator 83 and restoring of the magnetic head, by skipping the playing of the third and fourth programs, to a position in which it corresponds to the first program.

The sensing slot switch 44 for switching between the two-channel stereophonic system and the four-channel stereophonic system has been described as acting automatically, when the four-channel stereophonic cartridge tape 70 is inserted in the cartridge receiving opening 12 of the player, to switch the player to the four-channel stereophonic system by virtue of the slit 71 formed in the front upper side portion of the cartridge. It is to be understood, however, that the sensing slot switch may be made to operate manually as well as automatically. If this is the case, it is possible for the player according to this invention to play a conventional eight-track cartridge tape recorded in four-channel stereo which is not provided with a special device.

It is also to be understood that any switching device may be used in place of the multivibrator 83, so long as the switching device is constructed and operates such that, when it is connected to the power source by the rotation of the rotary switch 80 taking place in conjunction with the movements of magnetic heads, the switch is closed to render operative the magnetic head moving device for moving the magnetic heads a distance corresponding to the spacing between the tracks and the switch is opened when the movement of the magnetic heads is completed.

From the foregoing description, it will be appreciated that the combination four-channel two-channel stereophonic cartridge tape player according to this invention is constructed basically for playing a conventional eight-track cartridge tape of the two-channel stereophonic system and is capable, when an eight-track cartridge tape of the four-channel stereophonic system is inserted in the player, of playing it by automatically or manually switching the player to the four-channel stereophonic system. The player according to this invention thus offers an advantage in that the need to use two different players for reproducing cartridge tapes recorded in two-channel stereo and four-channel stereo is eliminated, because the player according to this invention is a utility player which can play cartridge tapes of both the two-channel and four-channel stereophonic systems by using simple automatic and manual changeover devices for changing over the player to the four-channel stereophonic system.

When an 8-track cartridge tape of the two-channel stereophonic system is played by the player according to this invention, one of the program indication lamps is turned on in accordance with the program being played (first to fourth program) of the tape. However, when an 8-track cartridge tape of the four-channel stereophonic system is played, two pilot lamps are turned on during the time the first program is being played, one of such two lamps being the indication lamp 15 which corresponds to the first program of the two-channel stereophonic system and the other being the indication lamp 17 which corresponds to the third program of the two-channel stereophonic system. During the time the second program is being played, two indication lamps 16 and 18 one of which corresponds to the second program of the two-channel stereophonic system and the other of which corresponds to the fourth program of the two-channel stereophonic system are turned on. The fact that the two indication lamps are simultaneously turned on when a tape recorded in four-channel stereo is played offers the additional advantage of being able to indicate whether the cartridge tape being played is of the two-channel stereophonic system or the four-channel stereophonic system without using a special indication means for this purpose.

When an eight-track cartridge tape of the two-channel stereophonic system is played, the magnetic heads will move three times and be returned to the original program position in the fourth movement; when an eight-track cartridge tape of the four-channel stereophonic system is played, the magnetic heads should be returned to the original program position in the second movement. To this end, means is provided in the present invention for moving the magnetic heads to the original program position in their second movement by skipping the second and third movement when an eight-track cartridge tape of the two-channel stereophonic system is played. This offers an additional advantage in that, when an eight-track cartridge tape of the four-channel stereophonic system is played, sound reproduction is carried out with the magnetic heads successively moving in their second and third movements as is the case with the playing of an eight-track cartridge tape of the two-channel stereophonic system. This is effective to avoid disunity in sound reproduction in the four-channel stereophonic system. When the speakers are arranged as shown in FIG. 10, sounds can be reproduced by the speakers in a manner which is in accordance with the arrangement of musical instruments when the recording was made.

Besides, means is provided in the present invention for disconnecting two magnetic heads which are not required when an eight-track cartridge tape of the two-channel stereophonic system is played and for supplying part of the signals picked up by the magnetic heads corresponding to the left and right channels to the main amplifiers of the disconnected two magnetic heads. Because of this, when the speakers are arranged as shown in FIG. 10, a left channel signal is reproduced simultaneously by the left front speaker 65 and left rear speaker 66 and a right channel signal is reproduced simultaneously by the right front speaker 67 and right rear speaker 68. The speakers thus function in the same manner as the four-speaker system of the two-channel stereophonic system, making it possible to make the best use of the parts for achieving the results of carrying out satisfactory sound reproduction in stereo.

While this invention has been described with reference to a preferred embodiment thereof, it is to be understood that the invention is not limited to the specific form of the embodiment and that many changes and modifications may be made therein without departing from the spirit and scope of the invention.

What I claim is:

1. A cartridge tape player, which selectively reproduces four-channel stereophonic signals or two-channel stereophonic signals recorded on eight tracks on an endless magnetic tape enclosed in a cartridge, for receiving a first cartridge enclosing a tape recorded with the four-channel stereophonic signals of which the first channel signal is recorded on the first and second tracks, the second channel signal on the third and fourth tracks, the third channel signal on the fifth and sixth tracks and the fourth channel signal on the seventh and eighth tracks, and a second cartridge enclosing a tape recorded with the two-channel stereophonic signals of which the first channel signal is recorded on the first to fourth tracks and the second channel signal on the fifth to eighth tracks, said first and second cartridges having different shapes for identifying the respective cartridges, wherein said tape player comprises: a magnetic head assembly including four magnetic heads arranged as a unit and disposed transversely to the longitudinal direction of the tracks of the magnetic tape, said four magnetic heads being spaced apart from one another a distance corresponding to the spacing between the tracks to trace the tracks, wherein the first head is used for reproducing the first channel signal of the four-channel signals or the first channel signal of the two-channel signals, the second head is used for reproducing the second channel signal of the four-channel signals, the third head is used for reproducing the third channel signal of the four-channel signals or the second channel signal of the two-channel signals, and the fourth head is used for reproducing the fourth channel signal of the four-channel signals; a solenoid; means, responsive to the track ends, for energizing said solenoid; stepping means, responsive to the energization of said solenoid, for stepping said magnetic head assembly so that the magnetic heads are respectively brought into contact with different tracks, said stepping means making one cycle with four steps of the motion of said magnetic head assembly; four amplifiers for amplifying electrical signals; means for connecting a first head of the four magnetic heads with a first amplifier of the four amplifiers; means for connecting a third head of the four magnetic heads with a third amplifier of the four amplifiers, a multivibrator circuit which is normally open; a relay coil connected to the output of said multivibrator circuit; sensing means for detecting the difference between the shapes of the first and second cartridges inserted into the tape player; first switching means, responsive to the detection of said sensing means for the second cartridge, for switching over the second amplifier to connect it in parallel with the first amplifier and for switching over the fourth amplifier to connect it in parallel with the third amplifier, said first switching means, also being responsive to the detection of said sensing means for the first cartridge, for switching over the second amplifier to connect it with a second magnetic head and for switching over the fourth amplifier to connect it with a fourth magnetic head; second switching means for switching over to close four circuits one by one synchronously with the operation of said stepping means, said four circuits being normally open; said first switching means, responsive to the detection of said sensing means for the first cartridge, for further closing said multivibrator circuit in response to the close of the third and fourth circuits of the four circuits by said second switching means to oscillate said multivibrator circuit; means, responsive to the energization of said relay coil by the oscillation current of said multivibrator circuit, for energizing said solenoid until said second switching means closes the first circuit of the four circuits.

2. The apparatus of claim 1 further comprising means, connected to said second switching means, for indicating whether the first or second cartridge is inserted in the tape player.

3. The apparatus of claim 2 wherein said means for indicating also indicates the particular program being played for each cartridge.

4. The apparatus of claim 3 wherein said indicating means comprises a plurality of lamps in which one lamp at a time is turned on to indicate when two-channel stereophonic sound is being reproduced and two lamps at a time are turned on for indicating when four-channel stereophonic sound is being reproduced.

* * * * *